(12) United States Patent
Yamakado et al.

(10) Patent No.: US 7,526,139 B2
(45) Date of Patent: Apr. 28, 2009

(54) IMAGE PROCESSING FOR IMPROVING CHARACTER READABILITY OF CHARACTERS DISPOSED ON AN IMAGE

(75) Inventors: Hitoshi Yamakado, Hino (JP); Shinji Miwa, Hokuto (JP)

(73) Assignee: Seiko Epson Corporation (JP)

( * ) Notice: Subject to any disclaimer, the term of this patent is extended or adjusted under 35 U.S.C. 154(b) by 13 days.

(21) Appl. No.: 11/517,398

(22) Filed: Sep. 7, 2006

(65) Prior Publication Data

US 2007/0065012 A1 Mar. 22, 2007

(30) Foreign Application Priority Data

Sep. 16, 2005 (JP) ............................. 2005-270936

(51) Int. Cl.
*G06K 9/46* (2006.01)
*G06K 9/40* (2006.01)
*G09G 5/00* (2006.01)
*H04N 9/76* (2006.01)

(52) U.S. Cl. ........................ 382/264; 345/636; 348/589; 348/600; 382/191; 382/269; 382/284

(58) Field of Classification Search ................. 382/171, 382/172, 173, 176, 190, 191, 264, 269, 284; 345/636; 348/584–592, 597, 598, 599, 600
See application file for complete search history.

(56) References Cited

U.S. PATENT DOCUMENTS 4,742,557 A * 5/1988 Ma ............................. 382/172
4,831,447 A * 5/1989 Lake, Jr. ...................... 348/597

(Continued)

FOREIGN PATENT DOCUMENTS

DE 4445386 12/1994

(Continued)

OTHER PUBLICATIONS

Jung K. et al., "Text Information Extraction in Images and Video: a Survey," Pattern Recognition, Elsevier, GB, vol. 37, No. 5, May 2004, pp. 977-997, XP004496837 ISS: 0031-3203.

*Primary Examiner*—Matthew C Bella
*Assistant Examiner*—Anthony Mackowey
(74) *Attorney, Agent, or Firm*—Harness, Dickey & Pierce, P.L.C.

(57) ABSTRACT

An image processing apparatus includes: a memory that stores a background image and a character image that is separate from the background image and overlaps the background image; a processing target area determining unit that determines a processing target area in the background image, the processing target area being in a prescribed positional relation with the character image; a background feature parameter extracting unit that extracts from the processing target area a background feature parameter that includes a feature frequency showing a frequency characteristics of the processing target area; a character feature parameter extracting unit that extracts from the character image a character feature parameter that includes a feature frequency showing a frequency characteristics of the character image; a parameter determining unit that determines a parameter for use in image processing performed on the processing target area, according to a combination of the background feature parameter and the character feature parameter; and an image processor that performs image processing on the processing target area in accordance with the parameter determined by the parameter determining unit.

3 Claims, 5 Drawing Sheets

U.S. PATENT DOCUMENTS

| | | | |
|---|---|---|---|
| 5,140,416 A * | 8/1992 | Tinkler | 348/33 |
| 5,465,160 A * | 11/1995 | Kamo et al. | 358/401 |
| 5,617,484 A * | 4/1997 | Wada et al. | 382/172 |
| 5,825,937 A * | 10/1998 | Ohuchi et al. | 382/261 |
| 5,848,185 A * | 12/1998 | Koga et al. | 382/173 |
| 5,889,885 A * | 3/1999 | Moed et al. | 382/172 |
| 5,956,470 A * | 9/1999 | Eschbach | 358/1.9 |
| 5,995,665 A * | 11/1999 | Maeda | 382/232 |
| 6,044,178 A * | 3/2000 | Lin | 382/260 |
| 6,064,762 A * | 5/2000 | Haenel | 382/171 |
| 6,069,974 A * | 5/2000 | Tsukada et al. | 382/170 |
| 6,154,576 A * | 11/2000 | Anderson et al. | 382/269 |
| 6,175,663 B1 * | 1/2001 | Huang | 382/284 |
| 6,269,186 B1 * | 7/2001 | Makita | 382/172 |
| 6,359,657 B1 * | 3/2002 | Westerink et al. | 348/584 |
| 6,411,737 B2 * | 6/2002 | Wesolkowski et al. | 382/237 |
| 6,704,027 B2 | 3/2004 | Nakano | |
| 6,744,918 B1 * | 6/2004 | Caldato et al. | 382/164 |
| 6,766,054 B1 * | 7/2004 | Christensen et al. | 382/173 |
| 6,885,477 B2 * | 4/2005 | Karidi et al. | 358/3.27 |
| 6,917,707 B1 * | 7/2005 | Kubota | 382/176 |
| 7,064,759 B1 * | 6/2006 | Feierbach et al. | 345/469.1 |
| RE39,214 E * | 8/2006 | Gryskiewicz | 348/597 |
| 7,324,692 B2 * | 1/2008 | Kanamoto et al. | 382/182 |
| 2001/0019427 A1 * | 9/2001 | Komatsu | 358/1.18 |
| 2001/0055122 A1 * | 12/2001 | Nagarajan et al. | 358/1.9 |
| 2002/0037100 A1 * | 3/2002 | Toda et al. | 382/166 |
| 2002/0064307 A1 | 5/2002 | Koga et al. | |
| 2002/0094129 A1 * | 7/2002 | Chen et al. | 382/261 |
| 2004/0001634 A1 * | 1/2004 | Mehrotra | 382/232 |
| 2005/0012760 A1 * | 1/2005 | Yamamoto | 345/636 |
| 2005/0040939 A1 * | 2/2005 | Jobes et al. | 340/438 |
| 2005/0093890 A1 * | 5/2005 | Baudisch | 345/639 |
| 2005/0276506 A1 * | 12/2005 | Kwon et al. | 382/269 |
| 2007/0218439 A1 * | 9/2007 | Delahunt et al. | 434/236 |

FOREIGN PATENT DOCUMENTS

| | | |
|---|---|---|
| EP | 1182639 | 2/2002 |
| JP | 05-257439 | 10/1993 |
| JP | 10-293835 | 11/1998 |
| JP | 2000-089747 | 3/2000 |

* cited by examiner

IMAGE PROCESSING FOR IMPROVING CHARACTER READABILITY OF CHARACTERS DISPOSED ON AN IMAGE

The entire disclosure of Japanese Patent Applications No. 2005-270936, filed on Sep. 16, 2005, is expressly incorporated by reference herein.

BACKGROUND

1. Field of the Invention

The invention relates to a technique for improving character readability when generating an image in which characters are disposed on an image such as a photograph.

2. Description of the Related Art

In documents such as catalogs and pamphlets, characters are often arranged with a photograph or the like as background. However, when characters are simply disposed on a background image, problems of character readability caused by the background photograph often arise. Techniques for improving the readability of characters disposed on a background image are described in JP-A-H5-257439, JP-A-200089747, and JP-A-H10-293835, for example. JP-A-H5-257439 and JP-A-2000-89747 disclose techniques for when characters are combined with a background image that involve detecting the color information of a peripheral portion of the characters, determining an opposite color based on the detected color information and the color information of the background image, and changing the color of the peripheral portion of the characters using the determined opposite color. JP-A-H10-293835 discloses a technique that involves adjusting the color values of the three-primary color data constituting a character image relative to the color values of the three-primary color data constituting the background image.

The above patent publications all involve changing only the color of the background image or the color of the character area. Consequently, if a background area overlapping with a character area had a high frequency characteristics, for example, character readability could not be sufficiently ensured due to background image flicker.

SUMMARY

An advantage of some aspects of the invention is to provide a technique that enables character readability to be ensured even when a background image has a high frequency characteristics.

According to an aspect of the invention, an image processing apparatus includes: a memory that stores a background image and a character image that is separate from the background image and overlaps the background image; a processing target area determining unit that determines a processing target area in the background image, the processing target area being in a prescribed positional relation with the character image; a background feature parameter extracting unit that extracts from the processing target area a background feature parameter that includes a feature frequency showing a frequency characteristics of the processing target area; a character feature parameter extracting unit that extracts from the character image a character feature parameter that includes a feature frequency showing a frequency characteristics of the character image; a parameter determining unit that determines a parameter for use in image processing performed on the processing target area, according to a combination of the background feature parameter and the character feature parameter; and an image processor that performs image processing on the processing target area in accordance with the parameter determined by the parameter determining unit.

According to another aspect of the invention, an image processing apparatus includes: a memory for storing a background image and a character image that is separate from the background image and overlaps the background image; a processing target area determining unit for determining a processing target area in the background image, the processing target area being in a prescribed positional relation with the character image; a background feature parameter extracting unit for extracting from the processing target area a background feature parameter that includes a feature frequency showing a frequency characteristics of the processing target area; a character feature parameter extracting unit for extracting from the character image a character feature parameter that includes at least one of brightness and saturation of the character image; a parameter determining unit for determining a parameter for use in image processing performed on the processing target area, according to a combination of the background feature parameter and the character feature parameter; and an image processor for performing image processing on the processing target area in accordance with the parameter determined by the parameter determining unit.

According to still another aspect of the invention, an image processing apparatus includes: a memory for storing a background image and a character image that is separate from the background image and overlaps the background image; a processing target area determining unit for determining a processing target area in the background image, the processing target area being in a prescribed positional relation with the character image; a background feature parameter extracting unit for extracting from the processing target area a background feature parameter that includes a feature frequency showing a frequency characteristics of the processing target area; a character feature parameter extracting unit for extracting from the character image a character feature parameter that includes a feature frequency showing a frequency characteristics of the character image, and at least one of brightness and saturation of the character image; a parameter determining unit for determining a parameter for use in image processing performed on the processing target area, according to a combination of the background feature parameter and the character feature parameter; and an image processor for performing image processing on the processing target area in accordance with the parameter determined by the parameter determining unit.

It is preferable that the image processing apparatus further includes: a frequency determining unit that determines whether the feature frequency of the processing target area is high or low by (A) comparing the feature frequency of the processing target area and the feature frequency of the character image, (B) comparing the difference between the feature frequency of the processing target area and the feature frequency of the character image with a predetermined threshold, or (C) comparing the feature frequency of the processing target area with a predetermined threshold, wherein the image processor performs the image processing if the feature frequency of the processing target area is determined by the frequency determining unit to be high.

It is preferable that the image processing performed by the image processor is blurring, the parameter determined by the parameter determining unit is an intensity of the blurring, the frequency determining unit further determines whether the feature frequency of the character image is high or low by (D) comparing the feature frequency of the processing target area and the feature frequency of the character image, or (E) comparing the feature frequency of the character image with a predetermined threshold, and the parameter determining unit determines the parameter so that a blurring intensity p1 when the feature frequency of the character image is low and a blurring intensity p2 when the feature frequency of the character image is high satisfy p1<p2.

It is preferable that the image processing performed by the image processor is processing to increase a difference in brightness between the character image and the processing target area, and the parameter determined by the parameter determining unit is an amount of change in brightness of the processing target area.

It is preferable that the character feature parameter includes both brightness and saturation of the character image, the image processing apparatus further includes: a saturation determining unit that determines from the saturation of the character image whether the character image is an achromatic color; and a brightness determining unit that determines whether the brightness of the character image is high or low by comparing the brightness of the character image and the brightness of the background image, or comparing the brightness of the character image with a predetermined threshold, the image processing performed by the image processor is color overlaying for overlaying a color on the processing target area, the parameter determined by the parameter determining unit is an amount of change in brightness of the processing target area, and the parameter determining unit determines the parameter so that (1) the brightness of the color to be overlaid as a result of the color overlaying is higher than the brightness of the character image if the brightness of the character image is low, and (2) the brightness of the color to be overlaid as a result of the color overlaying is lower than the brightness of the character image if the brightness of the character image is high.

It is preferable that the parameter determined by the parameter determining unit includes information showing the color to be overlaid as a result of the color overlaying, and if the character image is determined by the saturation determining unit to not be an achromatic color, the parameter determining unit determines the parameter so that the color to be overlaid as a result of the color overlaying is a complementary color of the color of the character image.

It is preferable that the parameter determined by the parameter determining unit includes information showing the color to be overlaid as a result of the color overlaying, and if the brightness of the character image is determined by the brightness determining unit to be neither high nor low, the parameter determining unit determines the parameter so that the color to be overlaid as a result of the color overlaying is a complementary color of the color of the character image.

It is preferable that the parameter determined by the parameter determining unit includes information showing the color to be overlaid as a result of the color overlaying, and if the brightness of the character image is determined by the brightness determining unit to be neither high nor low, the parameter determining unit determines the parameter so that the color to be overlaid as a result of the color overlaying is the same hue as a representative color of the background image, and the brightness of the color to be overlaid is the opposite of the character image.

It is preferable that the image processing apparatus further includes: a brightness determining unit for determining whether the brightness of the character image is high or low by comparing the brightness of the character image and the brightness of the background image, or by comparing the brightness of the character image with a predetermined threshold, (1) if the brightness of the character image is determined by the brightness determining unit to be high, the image processor performs one or a plurality of (1-1) image processing to reduce the brightness of the background image, (1-2) image processing to reduce the saturation of the background image, and (1-3) image processing to reduce the contrast of the background image, and (2) if the brightness of the character image is determined by the brightness determining unit to not be high, the image processor performs one of (2-1) image processing to make the brightness of the background image the opposite of the brightness of the character image, (2-2) image processing to reduce the saturation of the background image, and make the brightness of the background image the opposite of the brightness of the character image, and (2-3) image processing to reduce the contrast of the background image, and make the brightness of the background image the opposite of the brightness of the character image.

According to still another aspect of the invention, an image processing method includes: storing a background image and a character image that is separate from the background image and overlaps the background image; determining a processing target area in the background image, the processing target area being in a prescribed positional relation with the character image; extracting from the processing target area a background feature parameter that includes a feature frequency showing a frequency characteristics of the processing target area; extracting from the character image a character feature parameter that includes at least one of a feature frequency showing a frequency characteristics of the character image, brightness of the character image, and saturation of the character image; determining a parameter for use in image processing performed on the processing target area, according to a combination of the background feature parameter and the character feature parameter; and performing image processing on the processing target area in accordance with the parameter determined in the parameter determining step.

According to still another aspect of the invention, a program product for causing a computer device to execute an image processing method, the method includes: storing a background image and a character image that is separate from the background image and overlaps the background image; determining a processing target area in the background image, the processing target area being in a prescribed positional relation with the character image; extracting from the processing target area a background feature parameter that includes a feature frequency showing a frequency characteristics of the processing target area; extracting from the character image a character feature parameter that includes at least one of a feature frequency showing a frequency characteristics of the character image, brightness of the character image, and saturation of the character image; determining a parameter for use in image processing performed on the processing target area, according to a combination of the background feature parameter and the character feature parameter; and performing image processing on the processing target area in accordance with the parameter determined in the parameter determining step.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
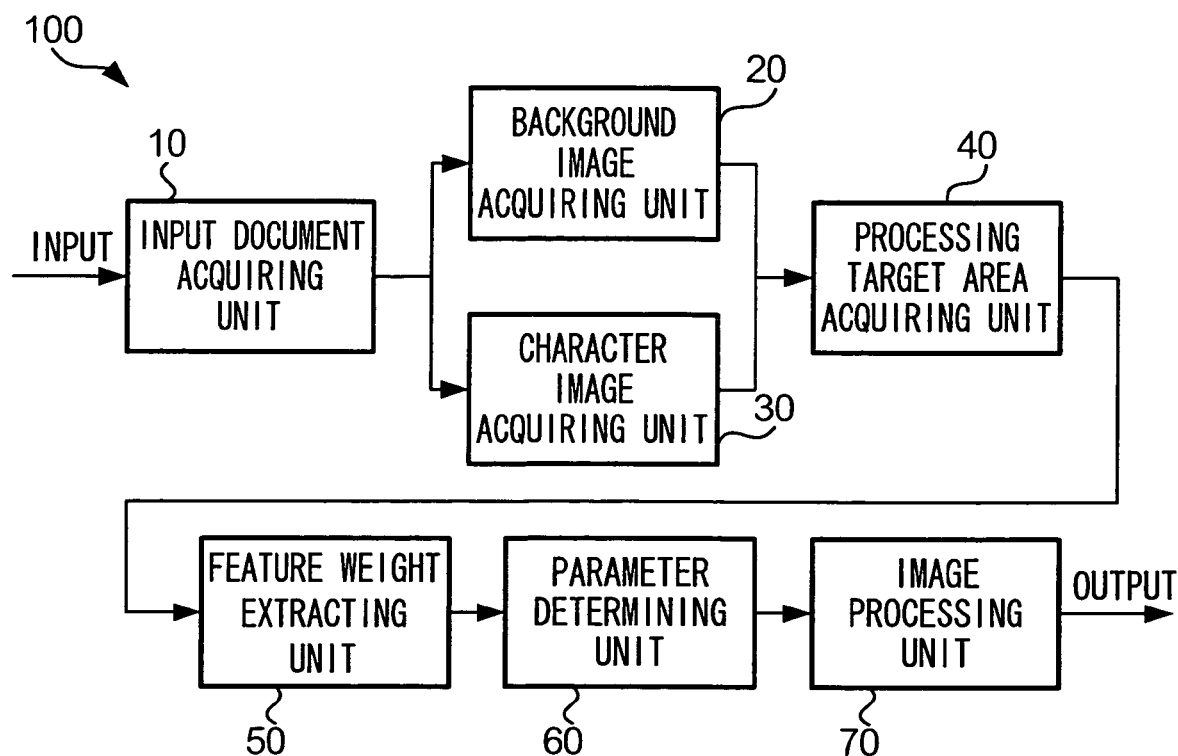
FIG. 1 is a functional block diagram of an image processing apparatus 100 according to a first embodiment.

FIG. 1 is a functional block diagram of an image processing apparatus 100 according to a first embodiment of the invention. An input document acquiring unit 10 acquires an input document (image data) including a background image and a character image. The background image and the character image are separate pieces of independent data in the input document. A background image acquiring unit 20 acquires the background image from the input document. A character image acquiring unit 30 acquires the character image from the input document. A processing target area acquiring unit 40 acquires information specifying an area of the background image as a processing target based on the character image, that is, an area that overlaps with the character image. A feature parameter extracting unit 50 extracts a feature parameter (frequency characteristics in the present embodiment) of the character image and the background image. A parameter determining unit 60 determines a parameter for use in image processing, according to a combination of the extracted feature parameters. An image processing unit 70 performs image processing for improving character readability in the processing target area, based on the frequency characteristics of the character image and the background image.

Figure 2:
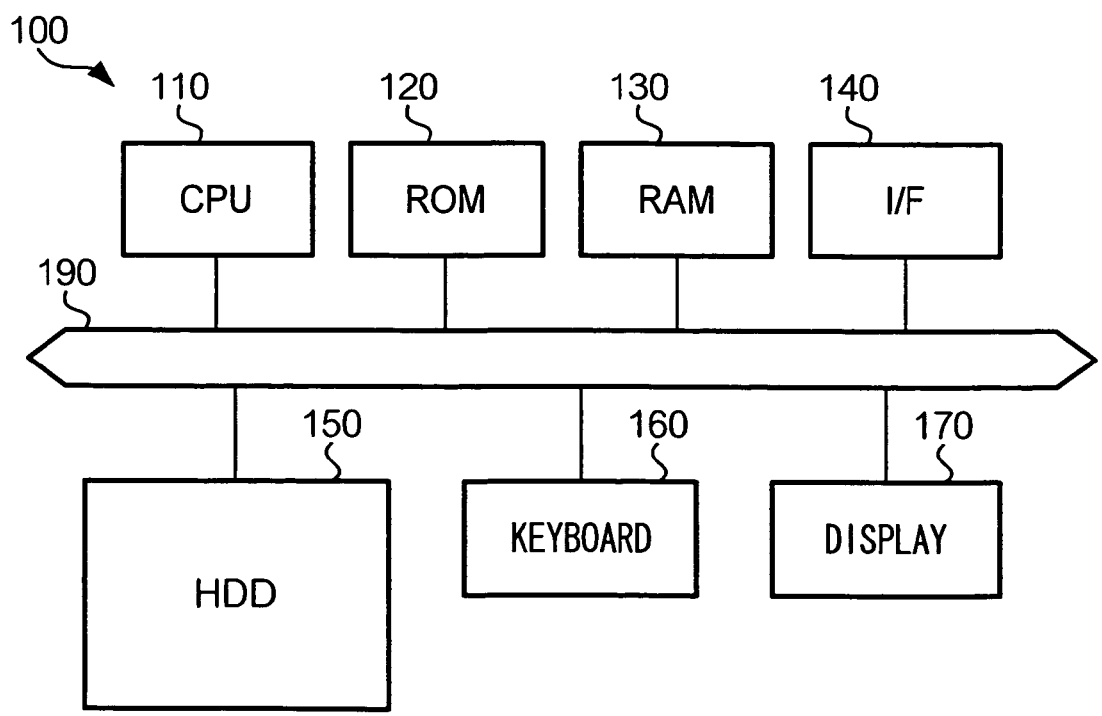
FIG. 2 is a block diagram showing a hardware configuration of the image processing apparatus 100.

FIG. 2 is a block diagram showing a hardware configuration of the image processing apparatus 100. The hardware configuration of the image processing apparatus 100 is similar to a general computer apparatus. A CPU (central processing unit) 110 is a control unit that controls the elements of the image processing apparatus 100. The CPU 110 reads and executes a control data generating program (device driver) stored on a HDD (hard disk drive) 150. A RAM (random access memory) 130 functions as a work area when the CPU 110 is executing computer programs. A ROM (read only memory) 120 stores computer programs and the like necessary for starting the image processing apparatus 100. An I/F 140 is an interface for transmitting and receiving data and control signals with another device such as a printer or the like. The HDD 150 is a storage device for storing various data and computer programs. A keyboard 160 and a display 170 are user interfaces for a user to perform operation inputs to the image processing apparatus 100. The above constitutional elements are interconnected by a bus 190. The image processing apparatus 100 is equipped with functions equating to the constitutional elements shown in FIG. 1 as a result of the CPU 110 executing an image processing program.

Figure 3:
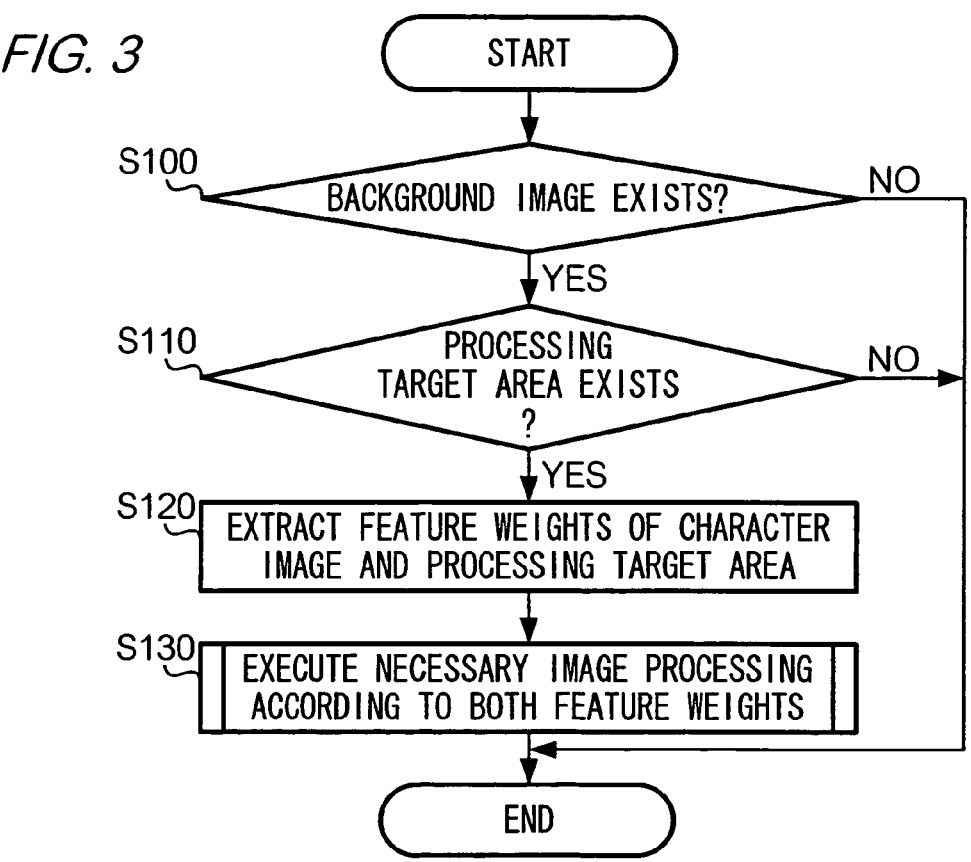
FIG. 3 is a flowchart showing the operation of the image processing apparatus 100.

FIG. 3 is a flowchart showing the operation of the image processing apparatus 100. When the user instructs the execution of the image processing program by operating the keyboard 160, the CPU 110 reads the image processing program from the HDD 150 and executes the read image processing program. The image processing program is a computer program capable of editing both image data that includes an image such as a photograph, a natural image, or a draw image (hereinafter referred to as a "background image" for the sake of descriptive convenience), and data that shows a text image (characters) (hereinafter referred to as a "character image" for the sake of descriptive convenience). In the following description, data including background and character images that is targeted for editing by the image processing program is referred to as an "input document." When the user further instructs the execution of image processing according to the invention, the CPU 110 firstly determines whether a background image is included in the input document (step S100). A single image or a single piece of text is managed in the input document in data groups called "objects." Each object has attribute information concerning the object. The attribute information includes, for example, information showing the object type (image data or text data), and information showing the object size and position. The CPU 110 determines whether a background image is included in the input document based on the attribute information of objects. If a background image is not included in the input document (step S100: NO), the CPU 110 ends the processing. Note that in the present embodiment an image including only a simple gradation or an image including only one specific color is not included as a background image. The reason being that character readability problems are considered unlikely to arise when a character image overlaps with such an image, making it unnecessary to apply image processing according to the present embodiment. The judgment as to whether a background image is included in the input document may also be performed by seeking the frequency characteristics of objects included in the input document that have the image attribute.

If a background image is included in the input document (step S100: YES), the CPU 110 then determines whether a processing target area exists in the input document (step S110). A processing target area in the case where a character image and a background image overlap is an area of the background image that includes a prescribed margin around the periphery of the area overlapped by the character image. If a processing target area does not exist (step S110: NO), the CPU 110 ends the processing.

Figure 4:
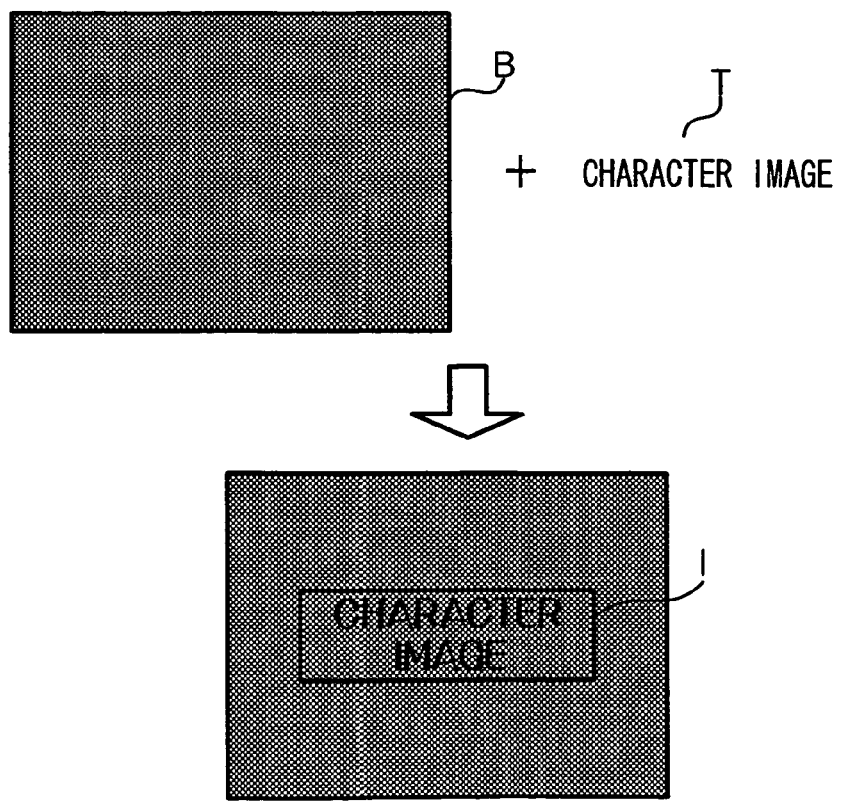
FIG. 4 illustrates a character image, a background image, and a processing target area.

FIG. 4 illustrates a character image, a background image, and a processing target area. A character image T overlaps a background image B. The area in FIG. 4 enclosed by the dotted line is a processing target area I. Note that the background image B, which is actually a photograph, draw image or the like, is shown in FIG. 4 using hatching due to the difficulty of illustrating such an image.

The following description again refers to FIG. 3. The CPU 110 determines whether a character image overlaps the background image based on the attribute information of objects, particularly information showing the position and size of objects. If there is overlap between a character image and the background image, the CPU 110 determines that a processing target area exists (step S110: YES). If a processing target area is determined to exist, the CPU 110 generates processing target area specifying information that specifies the processing target area. The processing target area specifying information is, for example, the coordinates of the vertices of a polygon forming the outer edge of the processing target area. The size of the processing target area is predetermined. For example, an a dot margin may be provided above and below the area corresponding to the character image and a b dot margin provided to the left and right. Alternatively, a c % margin may be provided above and below and a d % margin provided to the left and right relative to the size of the area corresponding to character image. Note that the shape of the processing target area is not limited to a rectangle, and may be other shapes such as a three-sided or five-sided polygon or an arc.

Next, the CPU 110 extracts the feature parameters of the processing target area and the character image (step S120). In the present embodiment, a feature frequency $\omega t$ of the character image and a feature frequency $\omega b$ of the processing target area are extracted as the feature parameters of the processing target area and the character image. Here, the "feature frequency" is a parameter that characterizes the frequency characteristics of an image. The feature frequency $\omega b$ of the processing target area is calculated as follows, for example. The CPU 110 performs a Fourier transform on the image data of the processing target area. The CPU 110 determines the frequency at which the spectral intensity of the spectrum obtained as a result the Fourier transform is greatest as the feature frequency. Note that the feature frequency is not limited to the frequency at which the spectral intensity is greatest. For example, the feature frequency may be a cutoff frequency at which the spectral intensity obtained as a result the Fourier transform is less than a predetermined threshold (or a predetermined percentage of the maximum value or average value of the spectral intensity). Alternatively, the feature frequency may be the central frequency of a frequency band at which the spectral intensity obtained as a result the Fourier transform is greater than a predetermined threshold (or a predetermined percentage of the maximum value or average value of the spectral intensity).

Alternatively, the feature frequency $\omega b$ of the processing target area may be calculated as follows. The CPU 110 scans the brightness component of the image data in the processing target area line by line, and counts the number of times the rising and falling slope of the brightness component inverts. The CPU 110 may calculate the feature frequency from a ratio of the counted number of inversions of the rising and falling slope to the number of pixel per line. Note that the method of calculating the feature frequency $\omega b$ is not limited to the methods described above. Any method is acceptable provided a feature frequency showing the features of an image can be calculated.

The feature frequency $\omega t$ of the character image is calculated as follows, for example. Character image data includes a character code, information showing the character font (typeface), information showing the font size, and information showing the font weight (bold or regular, etc). The HDD 150 stores in advance a table or a function for obtaining the feature frequency from the font size or font weight or other information. According to this table or function, a lower feature frequency is obtained the larger the font size or the greater the font weight, and a higher feature frequency is obtained the smaller the font size or the lower the font weight. Note that the method of calculating the feature frequency $\omega t$ of the character image is not limited to this. For example, bitmap data showing the character image may be generated from the character code, the information showing the character font, the information showing the font size and the information showing the font weight, and similar processing to that used to calculate the feature frequency $\omega b$ of the processing target area performed on the generated bitmap data.

Next, the CPU 110 executes necessary image processing on the processing target area, according to the feature frequency $\omega t$ of the character image and the feature frequency $\omega b$ of the processing target area (step S130).

Figure 5:
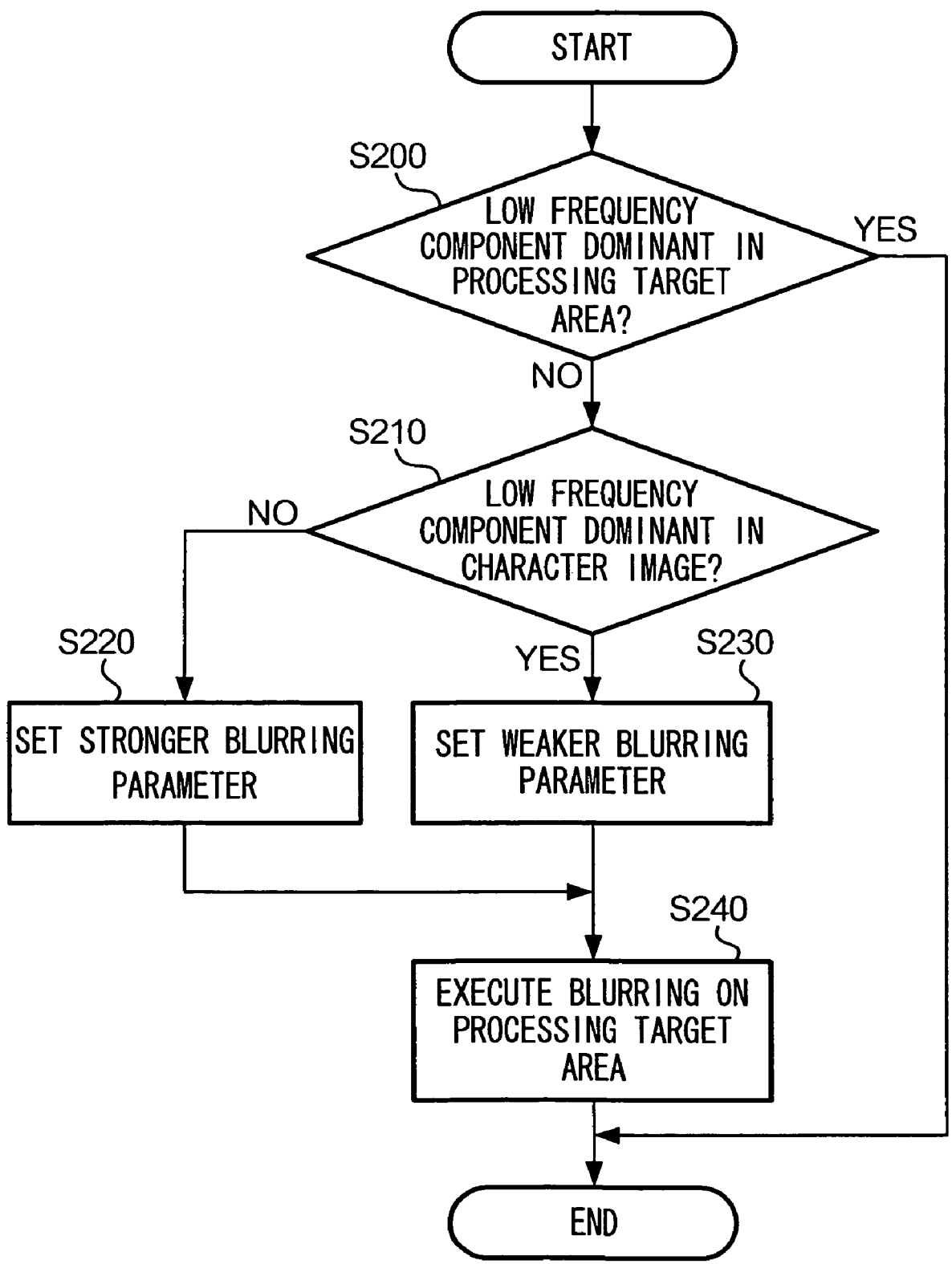
FIG. 5 is a flowchart showing a detail of image processing according to the first embodiment.

FIG. 5 is a flowchart showing a detail of image processing according to the present embodiment. In the present embodiment, the image processing in step S130 is so-called "blurring". The CPU 110 firstly determines whether the low frequency component is dominant in the processing target area (step S200). The judgment as to whether the low frequency component is dominant is performed as follows, for example. The CPU 110 compares $\omega t$ and $\omega b$. If $\omega b < \omega t$, the CPU 110 determines that the low frequency component is dominant in the background image. Alternatively, the CPU 110 may determine that the low frequency component is dominant in the background image if $\omega b < \alpha \omega t$ ($\alpha$ being a constant). Alternatively, the CPU 110 may determine whether the low frequency component is dominant by comparing the feature frequency $\omega b$ of the processing target area with a predetermined threshold $\omega bth$.

If the low frequency component is determined to be dominant in the processing target area (step S200: YES), the CPU 110 ends the processing. If the low frequency component is determined not to be dominant in the processing target area (step S200: NO), the CPU 110 determines whether the low frequency component is dominant in the character image (step S210). The judgment as to whether the low frequency component is dominant in the character image is performed similarly to the judgment as to whether the low frequency component is dominant in the processing target area. That is, the CPU 110 may determine whether the low frequency component is dominant in the character image by comparing $\omega t$ and $\omega b$, or by comparing $\omega t$ with a predetermined threshold $\omega th$.

If the low frequency component is determined to be dominant in the character image (step S210: YES), the CPU 110 sets the blurring parameter showing the blurring intensity for when blurring is performed on the processing target area to a predetermined value p1 (step S230). A situation in which the low frequency component is dominant in the character image arises when the character font size is sufficiently large or when the font weight is sufficiently great. That is, the intensity of the blurring specified by the blurring parameter p1 is low because character readability in this case is relatively high to begin with. Once the blurring parameter has been set, the CPU 110 moves the processing to step S240.

If the low frequency component is determined not to be dominant in the character image (step S210: NO), the CPU 110 sets the blurring parameter showing the blurring intensity for when blurring is performed on the processing target area to a predetermined value p2 (step S220). A situation in which the low frequency component is not dominant in the character image arises when the character font size is small or when the font weight is low. Character readability in this case is low if some sort of processing is not performed because of the difficulty in distinguishing between the background image and the character image. Consequently, stronger blurring is performed on the processing target area in order to improve character readability. That is, the intensity of the blurring specified by the blurring parameter p2 is high. Once the blurring parameter has been set, the CPU 110 moves the processing to step S240.

In step S240, the CPU 110 performs blurring on the processing target area in accordance with the blurring parameter. The CPU 110 stores the data of the background image on which blurring was performed in the RAM 130 or the HDD 150. Note that the blurring in the present embodiment may be a well-known blurring process such as the so-called Gaussian blur.

Note that although the CPU 110 in the above embodiment ends the processing if the low frequency component is determined to be dominant in the processing target area (step S200: YES), image processing may still be performed in this case.

In this case, the intensity of the blurring specified by the blurring parameter preferably is set to high.

Also, although a mode was described in the above embodiment whereby the frequency characteristics of the character image is determined in step S210, and the blurring parameter is determined according to the frequency characteristics of the character image, the blurring parameter in the case where the low frequency component is dominant in the processing target area may be determined uniformly without being dependant on the frequency characteristics of the character image.

Also, although the blurring parameters p1 and p2 are predetermined in the above embodiment, the value of these parameters may be determined dynamically according to one or both of ωt and ωb. For example, the image processing apparatus 100 may store in advance a table or a function in the HDD 150 for obtaining a blurring parameter p from ωt. In this case, the CPU 110 may determine the value of the blurring parameter p based on the value of ωt and the table or function stored in the HDD 150.

According to the present embodiment described above, the intensity of blurring performed on a processing target area is determined by a combination of the frequency characteristics of the processing target area and the frequency characteristics of the character image. Consequently, character readability can be ensured even when the background image has a high frequency characteristics.

Second Embodiment

A second embodiment of the invention is described next. Description of items common with the first embodiment is omitted from the following description. Also, constitutional elements common with the first embodiment are described using common reference signs. In the second embodiment, the feature parameters extracted in step S120 of FIG. 3 are different from those described in the first embodiment. In the present embodiment, the CPU 110 in step S120 of FIG. 3 extracts the saturation and brightness of the character image and the feature frequency ωb of the processing target area as the feature parameters. The detail of the image processing in step S130 of FIG. 3 is different from that shown in FIG. 5.

Figure 6:
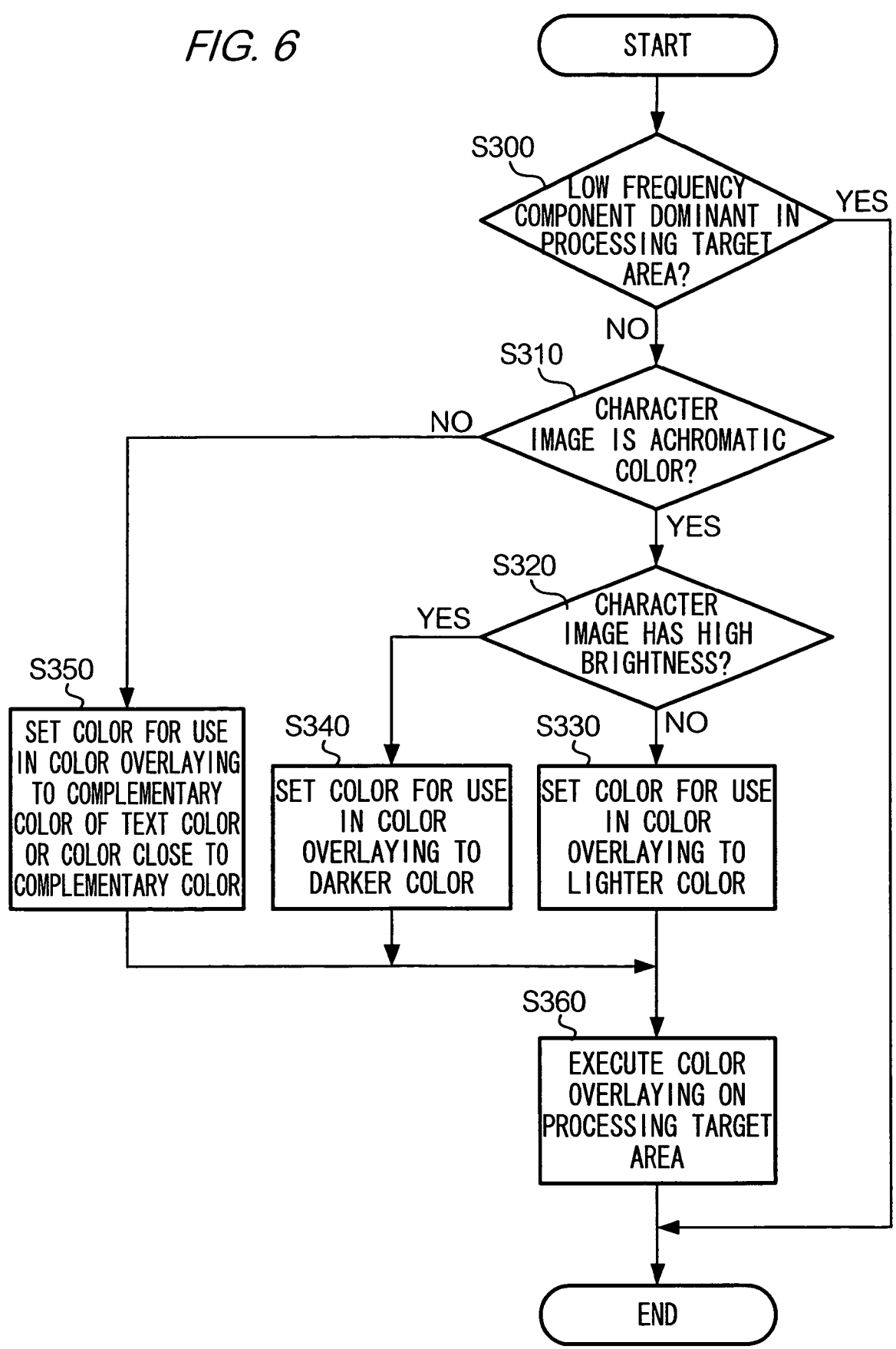
FIG. 6 is a flowchart showing a detail of image processing according to a second embodiment.

FIG. 6 is a flowchart showing a detail of image processing according to the second embodiment of the invention. In the present embodiment, the image processing in step S130 is so-called "color overlaying". The CPU 110 firstly determines whether the low frequency component is dominant in the processing target area (step S300). The judgment as to whether the low frequency component is dominant is as described in the first embodiment (FIG. 5: step S200). If the low frequency component is dominant in the processing target area (step S300: YES), the CPU 110 ends the processing.

If the low frequency component is determined not to be dominant in the processing target area (step S300: NO), the CPU 110 determines whether the character image is constituted by an achromatic color (step S310). If the character image is determined to be constituted by an achromatic color (step S310: YES), the CPU 110 determines whether the brightness of the character image is high (step S320). Similarly to the case of the feature frequency, the judgment as to whether the brightness of the character image is high may be performed by comparing the brightness of the character image and the brightness of the processing target area, or by comparing the brightness of the character image with a predetermined threshold.

If it is not determined that the brightness of the character image is high (step S320: NO), the CPU 110 sets the brightness parameter showing the color brightness for when color overlaying is performed on the processing target area to a predetermined value p1 (step S330). Since the brightness of the character image is low in this case, the value of the brightness parameter p1 is set so that the brightness of the color for overlaying will be high. If the brightness of the character image is determined to be high (step S320: YES), the CPU 110 sets the brightness parameter showing the color brightness for when color overlaying is performed on the processing target area to a predetermined value p2 (step S340). Since the brightness of the character image is high in this case, the value of the brightness parameter p2 is set so that the brightness of the overlaid color will be low.

In steps S330 and S340, the CPU 110 further determines the color for use in the color overlaying. That is, the CPU 110 determines the mean color of the processing target area (or the entire background image) as the color for use in the color overlaying. Alternatively, the CPU 110 may determine the dominant color (color that appears the most) of the processing target area (or the entire background image) as the color for use in the color overlaying. Once the brightness parameter and color for use in the color overlaying have been determined, the CPU 110 moves the processing to step S360.

If the character image is not constituted by an achromatic color (step S310: NO), the CPU 110 determines the complementary of the color of the character image or a color close to the complementary as the color for use in the color overlaying (step S350). Once the color for use in the color overlaying has been determined, the CPU 110 moves the processing to step S360.

In step S360, the CPU 110 performs color overlaying on the processing target area in accordance with the determined brightness parameter and color. The CPU 110 stores the data of the background image on which color overlaying was performed in the RAM 130 or the HDD 150.

Note that the color for use in the color overlaying determined in step S350 is not limited to the complementary color of the character image. For example, the CPU 110 may use the mean color or dominant color of the processing target area (or the entire background image), similarly to step S330 or step S340. Alternatively, the CPU 110 may use the mean of the complementary color of the character image and the mean color (or dominant color) of the processing target area (or the entire background image). From the standpoint of improving character readability, however, the color used in color overlaying preferably is close to the complementary color.

According to the present embodiment as described above, the color and brightness of color overlaying performed on the processing target area is determined by a combination of the frequency characteristics of the processing target area and the feature parameter (brightness, saturation) of the character image. Consequently, character readability can be ensured even when the background image has a high frequency characteristics.

Third Embodiment

A third embodiment of the invention is described next. Description of items common with the first embodiment is omitted from the following description. Also, constitutional elements common with the first embodiment are described using common reference signs. In the third embodiment, the feature parameters extracted in step S120 of FIG. 3 are different from those described in the first embodiment. In the present embodiment, the CPU 110 in step S120 of FIG. 3 extracts the brightness of the character image and the feature frequency ωb of the processing target area as the feature parameters. The detail of the image processing in step S130 of FIG. 3 is different from that shown in FIG. 5.

Figure 7:
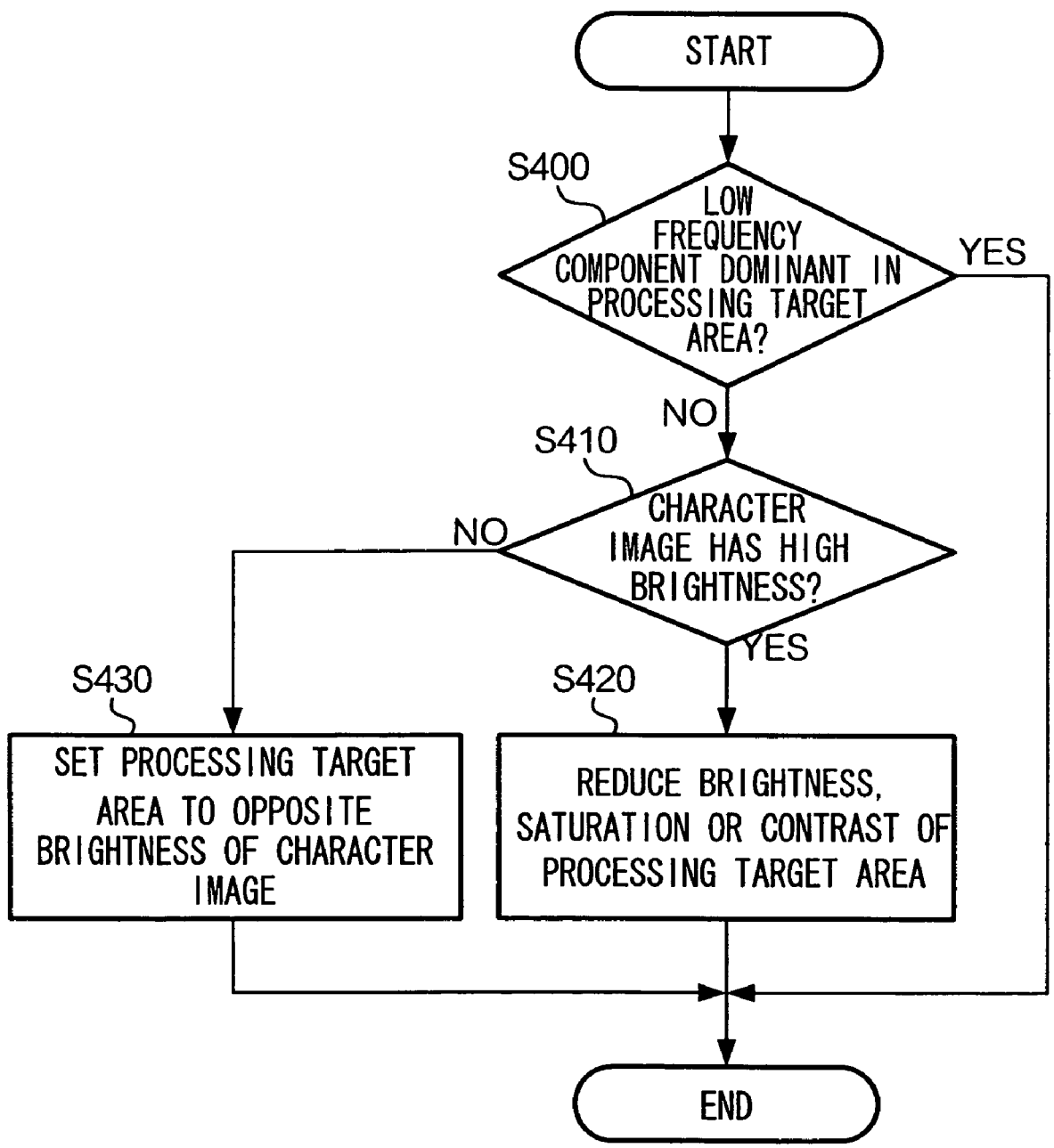
FIG. 7 is a flowchart showing a detail of image processing according to a third embodiment.

FIG. 7 is a flowchart showing a detail of image processing according to the third embodiment of the invention. In the present embodiment, the image processing in step S130 is processing to "reduce chrome". The CPU 110 firstly determines whether the low frequency component is dominant in the processing target area (step S400). The judgment as to whether the low frequency component is dominant is as described in the first embodiment (FIG. 5: step S200). If the low frequency component is dominant in the processing target area (step S400: YES), the CPU 110 ends the processing.

If the low frequency component is not determined to be dominant in the processing target area (step S400: NO), the CPU 110 determines whether the brightness of the character image is high (step S410). The judgment as to whether the brightness of the character image is high is as described in the second embodiment (FIG. 6: step S320).

If the brightness of the character image is determined to be high (step S320: YES), the CPU 110 performs one of the following processes (1) to (3) or processing that combines a plurality of these processes (step S420).

(1) Reduce the brightness of the processing target area. That is, darken the processing target area.

(2) Reduce the saturation of the processing target area. That is, the color of the processing target area is subdued, approaching gray.

(3) Reduce the contrast of the processing target area. That is, the color of the processing target area approaches gray.

According to such processing, the readability of a character image can be improved because the processing target area is a dark color or approaches gray. Note that the amount of change in brightness, saturation or contrast is an arbitrary design item. The amount of change in brightness, saturation or contrast may be predetermined or may be determined dynamically according to the brightness of the character image.

If the brightness of the character image is not determined to be high (step S320: NO), the CPU 110 performs processing to reverse the brightness of the processing target area, that is, to brighten the processing target area (step S430). Reversing the brightness of the processing target area refers to setting the brightness of the processing target area to +70% if the brightness of the processing target area was −70%, for example. Note that processing to reduce the saturation of the processing target area or to reduce the contrast of the processing target area may be performed together with the processing to brighten the processing target area.

According the present embodiment as described above, image processing to increase the difference in brightness between the character image and the processing target area is performed according to a combination of the frequency characteristics of the processing target area and the brightness of the character image. Character readability can be improved as a result.

Further Embodiment

In the above embodiments, modes were described in which image processing on a processing target area is determined according to a combination of the feature parameters of the character image and the processing target area. However, the CPU 110 may perform predetermined image processing on the processing target area, without depending on the combination of feature parameters.

What is claimed is:

1. An image processing apparatus, comprising:
a memory that stores background image data and character image data, the background image data showing a background image, the character image data being separated from the background image data and showing a character image that overlaps the background image;
a processing target area determining unit that determines a processing target area in the background image, the processing target area being in a prescribed positional relation with the character image;
a background feature parameter extracting unit that extracts from the background image data of the processing target area a background feature parameter that includes a feature frequency showing a frequency characteristic of the processing target area, the frequency being a number of cycles completed by a periodic quantity in a unit time in a curve showing the background image data in a plane defined by pixel gradation and position;
a character feature parameter extracting unit that extracts from the character image data a character feature parameter that includes a feature frequency showing a frequency characteristic of the character image;
a parameter determining unit that determines a parameter for use in image processing performed on the background image data of the processing target area, according to a combination of the background feature parameter and the character feature parameter;
an image processor that performs image processing on the background image data of the processing target area in accordance with the parameter determined by the parameter determining unit; and
a frequency determining unit that determines whether the feature frequency of the processing target area is high or low by (A) comparing the feature frequency of the processing target area and the feature frequency of the character image, (B) comparing the difference between the feature frequency of the processing target area and the feature frequency of the character image with a predetermined threshold, or (C) comparing the feature frequency of the processing target area with a predetermined threshold,
wherein
the image processor performs the image processing if the feature frequency of the processing target area is determined by the frequency determining unit to be high,
the image processing performed by the image processor is blurring,
the parameter determined by the parameter determining unit is an intensity of the blurring,
the frequency determining unit further determines whether the feature frequency of the character image is high or low by (D) comparing the feature frequency of the processing target area and the feature frequency of the character image, or (E) comparing the feature frequency of the character image with a predetermined threshold, and
the parameter determining unit determines the parameter so that a blurring intensity p1 when the feature frequency of the character image is low and a blurring intensity p2 when the feature frequency of the character image is high satisfy p1<p2.

2. An image processing method, comprising:
storing background image data and character image data, the background image data showing a background image, the character image data being separated from the background image data and showing a character image that overlaps the background image;

determining a processing target area in the background image, the processing target area being in a prescribed positional relation with the character image;

extracting from the background image data of the processing target area a background feature parameter that includes a feature frequency showing a frequency characteristic of the processing target area, the frequency being a number of cycles completed by a periodic quantity in a unit time in a curve showing the background image data in a plane defined by pixel gradation and position;

extracting from the character image data a character feature parameter that includes at least one of a feature frequency showing a frequency characteristic of the character image;

determining a parameter for use in image processing performed on the background image data of the processing target area, according to a combination of the background feature parameter and the character feature parameter;

performing image processing on the background image data of the processing target area in accordance with the determined parameter; and determining whether the feature frequency of the processing target area is high or low by (A) comparing the feature frequency of the processing target area and the feature frequency of the character image, (B) comparing the difference between the feature frequency of the processing target area and the feature frequency of the character image with a predetermined threshold, or (C) comparing the feature frequency of the processing target area with a predetermined threshold, wherein the image processing is performed if the feature frequency of the processing target area is determined to be high, the image processing performed is blurring, the parameter determined is an intensity of the blurring, further determining whether the feature frequency of the character image is high or low by (D) comparing the feature frequency of the processing target area and the feature frequency of the character image, or (E) comparing the feature frequency of the character image with a predetermined threshold, and determining the parameter so that a blurring intensity $p1$ when the feature frequency of the character image is low and a blurring intensity $p2$ when the feature frequency of the character image is high satisfy $p1<p2$.

3. A program product stored on a computer readable medium for causing a computer device to execute an image processing method, the method comprising:

storing background image data and character image data, the background image data showing a background image, the character image data being separated from the background image data and showing a character image that overlaps the background image;

determining a processing target area in the background image, the processing target area being in a prescribed positional relation with the character image;

extracting from the background image data of the processing target area a background feature parameter that includes a feature frequency showing a frequency characteristic of the processing target area, the frequency being a number of cycles completed by a periodic quantity in a unit time in a curve showing the background image data in a plane defined by pixel gradation and position;

extracting from the character image data a character feature parameter that includes at least one of a feature frequency showing a frequency characteristic of the character image;

determining a parameter for use in image processing performed on the background image data of the processing target area, according to a combination of the background feature parameter and the character feature parameter;

performing image processing on the background image data of the processing target area in accordance with the determined parameter, and determining whether the feature frequency of the processing target area is high or low by (A) comparing the feature frequency of the processing target area and the feature frequency of the character image, (B) comparing the difference between the feature frequency of the processing target area and the feature frequency of the character image with a predetermined threshold, or (C) comparing the feature frequency of the processing target area with a predetermined threshold, wherein the image processing is performed if the feature frequency of the processing target area is determined to be high, the image processing performed is blurring, the parameter determined is an intensity of the blurring, further determining whether the feature frequency of the character image is high or low by (D) comparing the feature frequency of the processing target area and the feature frequency of the character image, or (E) comparing the feature frequency of the character image with a predetermined threshold, and determining the parameter so that a blurring intensity $p1$ when the feature frequency of the character image is low and a blurring intensity $p2$ when the feature frequency of the character image is high satisfy $p1<p2$.

* * * * *